US010066388B2

(12) United States Patent
Martino

(10) Patent No.: US 10,066,388 B2
(45) Date of Patent: Sep. 4, 2018

(54) MODULAR WALL PANELING SYSTEM

(71) Applicant: Marc G. Martino, Westlake Village, CA (US)

(72) Inventor: Marc G. Martino, Westlake Village, CA (US)

(*) Notice: Subject to any disclaimer, the term of this patent is extended or adjusted under 35 U.S.C. 154(b) by 0 days.

(21) Appl. No.: 14/961,461

(22) Filed: Dec. 7, 2015

(65) Prior Publication Data
US 2016/0083964 A1 Mar. 24, 2016

Related U.S. Application Data

(63) Continuation-in-part of application No. 14/214,817, filed on Mar. 15, 2014, now Pat. No. 9,227,764.
(Continued)

(51) Int. Cl.
E04B 2/46 (2006.01)
E04B 2/02 (2006.01)
(Continued)

(52) U.S. Cl.
CPC ............ *E04B 2/46* (2013.01); *B65D 73/0014* (2013.01); *E04B 2/02* (2013.01); *E04B 2/7457* (2013.01);
(Continued)

(58) Field of Classification Search
CPC .......... E04F 13/24; E04F 13/083; E04B 2/02; E04B 2/46; E04B 2/721; E04B 2/7457; E04B 2002/7487; E04B 2002/7466; E04B 2002/0202; E04B 2002/7483; G08B 13/20; B65D 73/0014; B65D 2203/10; B65D 2211/00; A47F 5/0018; A47F 5/08;
(Continued)

(56) References Cited

U.S. PATENT DOCUMENTS 3,305,981 A * 2/1967 Biggs .................... E04B 2/7863
52/317
3,486,632 A * 12/1969 Balch ........................ A47F 5/00
211/106.01
(Continued)

FOREIGN PATENT DOCUMENTS

DE 3726255 A1 * 1/1989 ........... E04B 2/7457

OTHER PUBLICATIONS

Machine translation of Foreign reference DE 3726255A1, obtained from https://patentscope.wipo.int/search/en/detail.jsf?docId=DE102670552&recNum=1&maxRec=&office=&prevFilter=&sortOption=&queryString=&tab=PCTDescription (last accessed on Jan. 12, 2017).*

*Primary Examiner* — Theodore V Adamos
(74) *Attorney, Agent, or Firm* — Hackler Daghighian Martino & Novak

(57) ABSTRACT

A modular wall paneling system includes at least two plates. Each plate defines a longitudinal length, and each plate has a plurality of fixture apertures disposed through the plate along the longitudinal length. Each plate has a plurality of panel apertures disposed through plate along the longitudinal length. The plurality of fixture apertures are generally parallel to the plurality of panel apertures. Included are a plurality of panels, each panel having a panel substrate and each panel having at least two hooks disposed on a backside of the panel substrate. Each of the at least two hooks are configured to removably lock into the panel apertures of the at least two plates.

20 Claims, 9 Drawing Sheets

Related U.S. Application Data

(60) Provisional application No. 61/786,597, filed on Mar. 15, 2013.

(51) Int. Cl.
    *E04F 13/08*     (2006.01)
    *E04B 2/74*     (2006.01)
    *B65D 73/00*     (2006.01)
    *G08B 13/20*     (2006.01)
    *G01M 3/32*     (2006.01)
    *H01H 35/34*     (2006.01)

(52) U.S. Cl.
    CPC ......... *E04F 13/083* (2013.01); *G01M 3/3272* (2013.01); *G08B 13/20* (2013.01); *B65D 2203/10* (2013.01); *B65D 2211/00* (2013.01); *E04B 2002/0202* (2013.01); *E04B 2002/7466* (2013.01); *E04B 2002/7483* (2013.01); *E04B 2002/7487* (2013.01); *H01H 35/346* (2013.01)

(58) Field of Classification Search
    CPC ........ A47F 5/0807; A47F 5/103; A47F 5/101; A47F 5/0025; G01M 3/3272; H01H 35/346
    USPC ......... 52/489.1, 481.2, 489.2, 481.1; 211/26, 211/26.2, 134, 135, 187, 150, 153, 211/189–193, 206
    See application file for complete search history.

(56) References Cited

U.S. PATENT DOCUMENTS

| | | | | |
|---|---|---|---|---|
| RE28,408 E | * | 5/1975 | Nelsson | A47B 96/1416 108/108 |
| 3,925,939 A | * | 12/1975 | Costruba | A47F 5/08 248/243 |
| 3,965,826 A | * | 6/1976 | Markham | A47B 57/42 108/108 |
| 4,395,858 A | * | 8/1983 | Gwyther | E04F 13/0816 52/506.09 |
| 4,570,390 A | * | 2/1986 | Wendt | E04B 2/74 211/190 |
| 4,638,606 A | * | 1/1987 | Wendt | E04B 2/74 211/190 |
| 4,704,835 A | * | 11/1987 | Jordan | E04B 2/7457 52/489.1 |
| 5,088,541 A | * | 2/1992 | Persing | E04B 2/7437 160/135 |
| 5,172,530 A | * | 12/1992 | Fishel | A47B 21/06 160/135 |
| 5,285,602 A | * | 2/1994 | Felton | A47B 96/1416 52/127.2 |
| 5,517,795 A | * | 5/1996 | Doke | A47B 96/1416 248/243 |
| 5,906,079 A | * | 5/1999 | Brickner | E04B 2/7416 52/238.1 |
| 6,047,838 A | * | 4/2000 | Rindoks | A47B 96/1458 211/187 |
| 6,115,977 A | * | 9/2000 | Hornberger | A47B 95/008 52/238.1 |
| 6,158,179 A | * | 12/2000 | Ackerly | E04B 2/745 52/126.3 |
| 6,418,689 B1 | * | 7/2002 | Hacquard | E04B 2/7457 52/238.1 |
| 6,644,609 B1 | * | 11/2003 | Scott | A47B 57/42 248/243 |
| 7,296,697 B2 | * | 11/2007 | Costa | A47B 47/022 211/175 |
| 7,743,578 B2 | * | 6/2010 | Edmondson | E04B 1/24 52/653.1 |
| 2005/0150850 A1 | * | 7/2005 | Stitchick | A47B 47/022 211/90.03 |
| 2007/0221595 A1 | * | 9/2007 | Chen | A47B 95/008 211/103 |
| 2007/0221597 A1 | * | 9/2007 | Chen | A47B 96/028 211/192 |
| 2011/0155677 A1 | * | 6/2011 | Fernandez | A47B 45/00 211/86.01 |
| 2011/0168651 A1 | * | 7/2011 | Stenftenagel | A47B 57/404 211/42 |
| 2013/0299439 A1 | * | 11/2013 | Sid | A47F 5/0018 211/134 |
| 2014/0083959 A1 | * | 3/2014 | Kalafut | A47F 5/0861 211/13.1 |

* cited by examiner

MODULAR WALL PANELING SYSTEM

CROSS-REFERENCE TO RELATED APPLICATIONS

This application is a continuation-in-part application that claims priority to application Ser. No. 14/214,817 filed on Mar. 15, 2014, which itself claimed priority to provisional application 61/786,597 filed on Mar. 15, 2013, the contents of which all applications are fully incorporated herein with this reference.

FIELD OF THE INVENTION

The present invention generally relates to a modular wall paneling system that allows quick and easy replacement of a variety of different types of panels.

BACKGROUND OF THE INVENTION

The present invention discloses two inventions, the first being directed to a pilf/theft resistant packaging system and the second being directed to a modular wall panel system.

The first invention concerns pilf resistant packaging and systems thereof. Theft of various products from within a store is a huge problem. A thief will literally cut a product out of the clear plastic packaging and steal the product after discarding the packaging. For instance, some department stores claim they have four knives stolen for every one knife that they actually sell. In the prior art, many have attempted to reduce the theft of such goods. The prior art has focuses at making cutting through the clear packaging more difficult such that it is a deterrent to a potential thief. However, adding a deterrent also makes the packaging harder to open for a legitimate customer. Also, various deterrents can appear ugly and deter a customer from purchasing the product. Accordingly, the present invention overcomes these problems and provides other benefits and advantages.

The second invention concerns construction of inside walls and surfaces of a building or domicile. In the prior art, construction of one's residence/home is dominated through the use of drywall. Drywall is placed over top of the studs of walls and usually insulation is placed between the spaces in the studs. Drywall is then either painted or wallpapered to finish the inside of a home.

A problem exists when a resident wants to install shelving or other various features into a dry walled wall. The home owner must purchase and use a stud finder to locate where the studs are now located. Once the studs are located, the studs are marked and then shelving can be directly attached to the studs. Shelves can be installed into the drywall itself, with special drywall screws. However, drywall is not nearly as strong as screwing directly into the studs of the home.

Many times during shelving installation the drywall is damaged or destroyed. This may occur from missing the studs when attempting to screw therein, marring the drywall with improper screws, having screws become jammed or having the threads on the screw head strip. Damage is also likely when electrical features are installed. For instance, to install a flat screen television onto a wall usually means the studs in a wall must be cross-drilled to accommodate the various electrical cords. To perform such work, a section of drywall must be removed to facilitate the installation of such electrical cords by running them through the studs. Accordingly, the present invention overcomes these problems and provides other benefits and advantages.

SUMMARY OF THE INVENTION

A modular wall paneling system includes at least two plates, where each plate is defined along a longitudinal length, and each plate has a plurality of fixture apertures disposed through the plate along the longitudinal length. Each plate also has a plurality of panel apertures disposed through plate along the longitudinal length, where the plurality of fixture apertures are generally parallel to the plurality of fixture apertures. Connecting to the plates are a plurality of panels, where each panel has a panel substrate and each panel has at least two hooks disposed on a backside of the panel substrate. Each of the at least two hooks are configured to removably lock into the panel apertures of the at least two plates.

At least one panel from the plurality of panels may comprise an electronic switch panel, a light switch panel, a cabinet panel, a light bulb panel, a back lit panel, a picture frame panel, a mirror panel, a T.V. stand panel, an electronic equipment stand panel, an equipment stand panel, a shelf panel, an electrical socket panel or an air register panel.

At least one plate from the at least two plates may comprise at least two plurality of panel apertures, wherein the at least two plurality of panel apertures are separated by the plurality of fixture apertures.

At least one plate from the at least two plates may comprise an angled bend.

Each of the at least two plates may comprise a first and a second extension disposed perpendicular to a surface of the plate.

The at least two plates may extruded. The at least two plates may be formed from a single flat piece of metal and then the plurality of fixture apertures and the plurality of panel apertures are punched there through. The first and second extensions may be formed from a bending process applied to each plate.

The first and second extensions may comprise a plurality of tabs. The plurality of tabs may be cut and bent at the same time the plurality of fixture apertures and panel apertures are formed.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

FIGS. 1-10 generally concern a theft-proof packaging system which includes a product package having a compartment configured to encapsulate a product, wherein the compartment is pneumatically pressurized above a surrounding environment. A pressure sensor assembly is located within the compartment. The pressure sensor assembly includes a pressure sensor, a power source electrically connected to the pressure sensor and a transmitter electrically connected to the power source. The transmitter is configured to send a signal. A receiving unit is located outside the compartment of the product package and disposed remote from the product package. The receiving unit includes a receiver configured to receive the signal from the transmitter and an alarm electrically coupled to the receiver. The pressure sensor assembly is configured to detect a change in pressure inside the compartment and then send the signal to the receiving unit activating the alarm.

The alarm may comprise a light or a speaker configured to produce an audible sound. The alarm may also send an alarm signal to an operator, where the alarm signal comprises a text message, an email, a phone message, a paging message.

An air pressure valve may be disposed within a surface of the compartment. The pressure sensor may comprise a pressure sensing bias, where the bias is configured to be overcome by the pneumatic pressure in the compartment and configured to not be overcome by a pressure of the surrounding environment.

A portion of the pressure sensor assembly may be in fluid communication with the inside of the compartment and an opposite portion of the pressure sensor assembly may be in fluid communication with the surrounding environment.

The pressure sensor may comprise a switch, where the switch is open in the presence of the pneumatic pressure inside the compartment and where the switch is closed when the pneumatic pressure inside the compartment is released.

Figure 1:
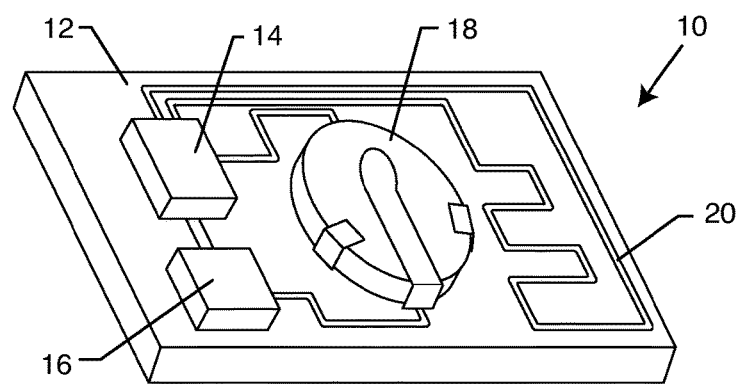
FIG. 1 is a perspective view of an exemplary pressure sensor assembly of the present invention.

FIG. 1 is a perspective view of an exemplary embodiment of the present invention. FIG. 1 shows a pressure sensor assembly 10. The pressure sensor assembly 10 is preferably small in size such that it can be placed within a packaging of a product. Many types of pressure sensor assemblies 10 may be used by one skilled in the art. A pressure sensor assembly 10 usually has a base substrate or circuit board 12. On the base substrate/circuit board 12 is mounted a power source 18, which can be a battery 18 or an externally powered passive RFID tag/receiver 18. As shown herein it is a battery 18. A battery 18 is preferred as it can transmit an extended distance as compared to a passive RFID tag and it also doesn't require a constant external signal to derive its power.

The battery 18 is connected to a microprocessor 16. The microprocessor 16 is able to perform various tasks that it is programmed to do. However, a microprocessor 16 is not even necessary in the present invention. A simple electrical circuit can be constructed that does not require the use of any electronic logic or programming, as will be later disclosed.

The battery 18 is also connected to a pressure sensor 14. Many types of pressure sensors 14 may be utilized for the present invention.

Also disposed or connected to the circuit board 12 is a transmitter/antenna 20. The transmitter 20 is configured to send a signal 44. The signal 44 may be many types of signals, such as a radio frequency signal or an infrared signal. The pressure sensor assembly 10 is constructed and configured to send the signal 44 upon detecting a pressure differential.

Figure 2:
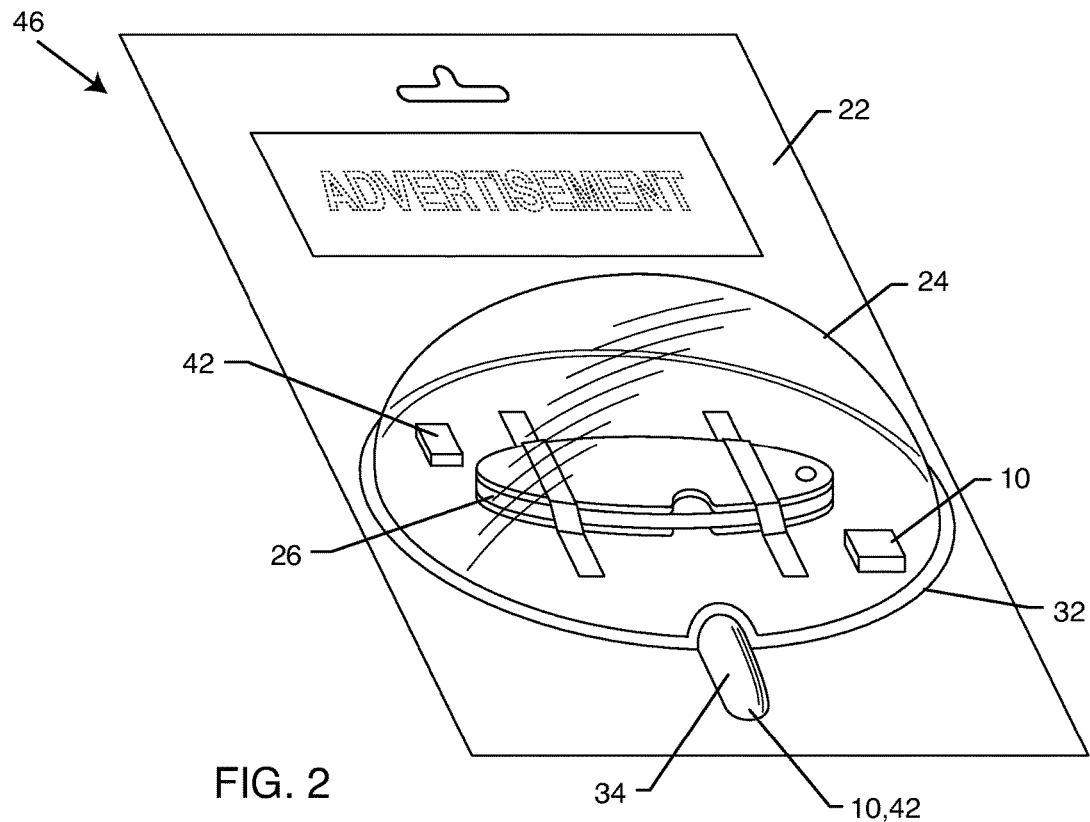
FIG. 2 is a perspective view of an exemplary product package containing the pressure sensor assembly of FIG. 1.

FIG. 2 is a perspective view of a package 46 containing a product 26. The product 26 shown herein is a knife. However, any type of product 26 can be housed within the packaging 46. The package 46 has a packaging base 22 and a packaging top 24. The packaging top 24 is shown herein as a clear bubble 24. In this way a consumer can visually see the product 26 enclosed within. It is a key aspect of the invention that the package top 24 and package bottom 22 are sealed together by a bond or seal 32 such that the enclosed volume can be pneumatically pressurized.

The pressure sensor assembly 10 is shown inside the bubble 24. The pressure sensor assembly 10 is configured to monitor the pressure inside the package 46. If a thief attempts to open the package the pressure inside the bubble 24 is released which is then detected by the pressure sensor assembly 10. The pressure sensor assembly 10 can then send a signal 44 to alert various devices.

Also shown in FIG. 2 is an RFID tag 42 attached to the package 46. The RFID tag 42 does not have to be inside the pressurized dome 24 and can be non-removably attached anywhere to the package 46. The RFID tag 42 is typically a passive RFID tag/device that can be detected when it passes through a detector. It is very typical for stores to have two scanners placed at the entrance of the store to scan for RFID tags that pass there between. This prevents a thief from attempting the steal the whole package 46. It is due to the knowledge of the RFID tag 42 that thieves will open the package 46, remove the product 26 and then discard the packaging 46.

FIG. 2 also shows a bump 34. This bump 34 is a portion of the package that may be constructed to hide either the pressure sensor assembly 10 or the RFID tag 42 from view. In this way a thief would not even know the package 46 contained any theft deterrent devices. If the pressure sensor device 10 is located within a bump 34, it must be in fluid communication with the chamber enclosing the product 26. As can be devised by one skilled in the art, various sizes and shapes of the bump 34 may be created that are aesthetically pleasing while also being functional. The present invention is not limited to the precise form disclosed and shown herein but is merely a representation of one embodiment.

Figure 3:
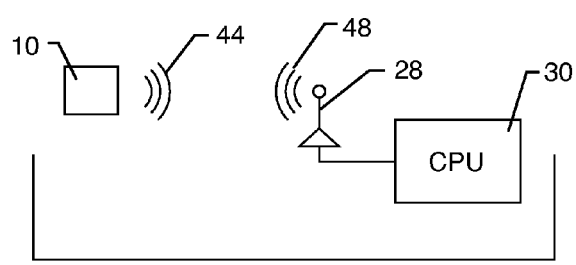
FIG. 3 is a schematic representation of the present invention in action.

FIG. 3 is a simple schematic of the present in operation. If the pressure inside the package 46 is released, the pressure sensor assembly 10 is configured to send a signal 44. The signal 44 is received by an external receiver 28. The receiver is then electrically connected to an alert device 30.

The alert device 30 can be a multitude of devices such as visual lights, audible alarm sounds, computers, cell phones, smart phones, laptop computers, specialized security systems and devices or combinations thereof. The alert device 30 can even be programmed to send a second signal 48 to alert various other devices or personnel. The second signal 48 can be a text message, an email, a pager signal, a tweet, a phone call or a phone message. The second signal 48 can be received by a buildings security system and direct security personnel to the area where the theft is occurring.

It would also be advantageous if the alert device 30 was configured to direct other electronic surveillance means to the location of the pressure sensor device 10. For instance, when a pressure sensor device 10 sends a signal 44, the location of the signal 44 can be tracked. Video of the area or location of the pressure sensor assembly 10 can be recorded and tracked. For example, two or three receivers 28 and two or three alert devices 30 can be used to accurately locate the location of the pressure sensor assembly 10.

A significant advantage of the present invention is that the exact moment a thief attempts to open a package 46 the pressure sensor assembly 10 will detect the pilfering. Yet, a customer can purchase the product and then open the package 46 outside the store. The package 46 does not have to include extra thick plastic or other theft deterrent means that is also difficult for the customer to open.

Figure 4:
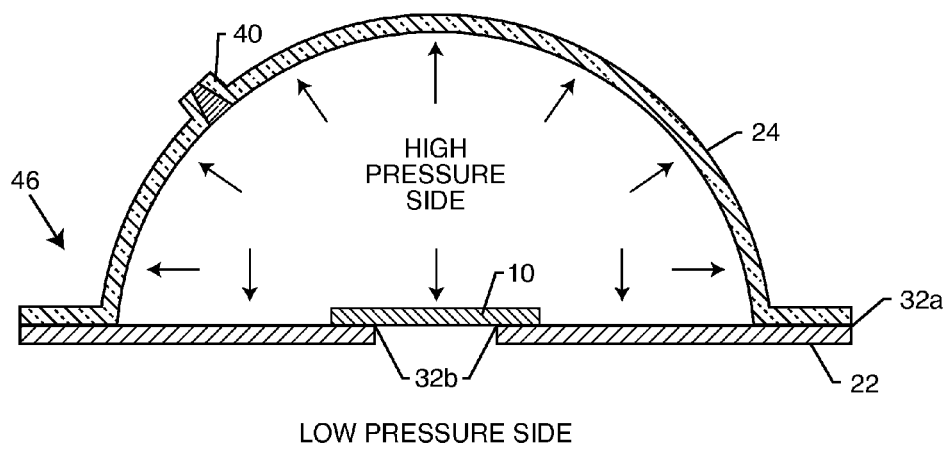
FIG. 4 is a sectional view of a pressure sensor assembly integrated with a product packaging.

FIG. 4 is a sectional view of one embodiment of the present invention. The inside of the dome 24 contains a high pressure side. A low pressure side is outside the package 46. The low pressure side is atmospheric pressure. Here, the pressure sensor assembly 10 is coupled to a wall of the package base 22. The pressure sensor assembly 10 is sealed 32b to the base 22. This means that the pressure sensor assembly itself has a low pressure side and a high pressure side which is used to detect a pressure change. The seal 32a seals the top 24 to the base 22.

A valve 40 is also shown. The valve 40 is just one embodiment of how a high pressure is created inside the package 46. The valve 40 can be used to pressurize the inside of the package 46. Alternatively, the inside of the package 46 can be pressurized during manufacture of the package 46 when the product 26 is enclosed therein.

Figure 5:
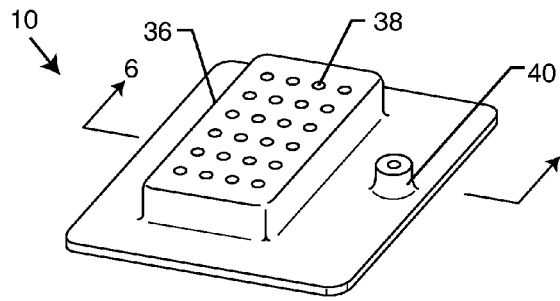
FIG. 5 is a perspective view of an exemplary pressure sensor assembly of the present invention.
Figure 6:
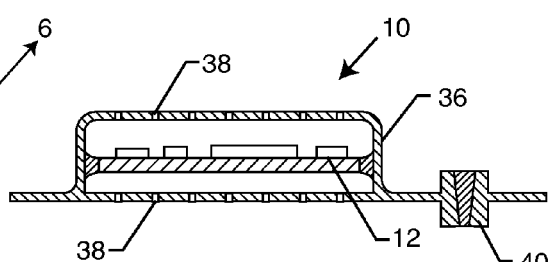
FIG. 6 is a sectional view taken of the structure of FIG. 5 along lines 6-6.

FIGS. 5 and 6 are just one example of an exemplary pressure sensor assembly 10. Shown herein, the pressure sensor assembly 10 has a housing 36. The housing 36 may then be sealed to the base 22 or top 24. The housing 36 has at least one hole/aperture 38 on each side. Air pressure is able to then flow to each side of the circuit board 12. The housing prevents a thief from tampering with the pressure sensor assembly 10 itself. The valve 40 may be integrated into the housing 36.

Figure 7:
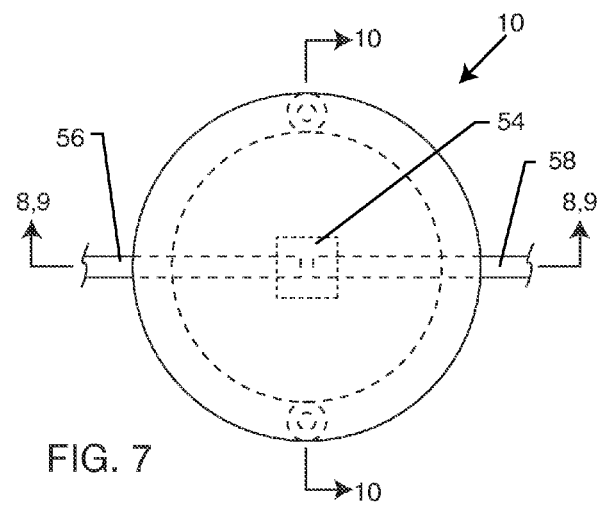
FIG. 7 is a top view of an exemplary pressure activated switch of the present invention.
Figure 8:
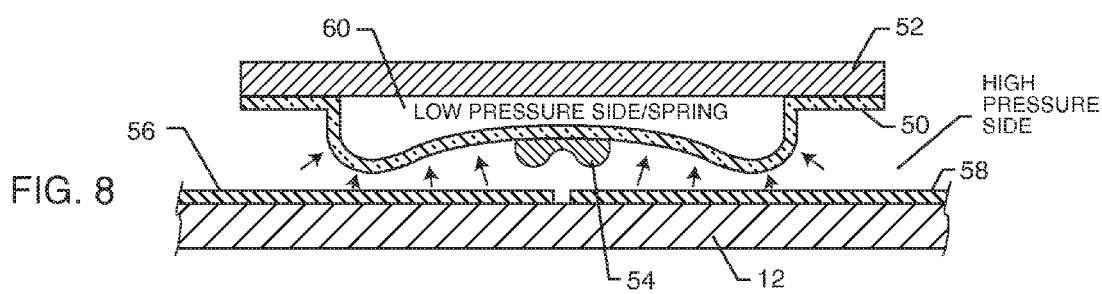
FIG. 8 is a sectional view taken of the structure of FIG. 7 along lines 8-8 wherein a high pressure is present.
Figure 9:
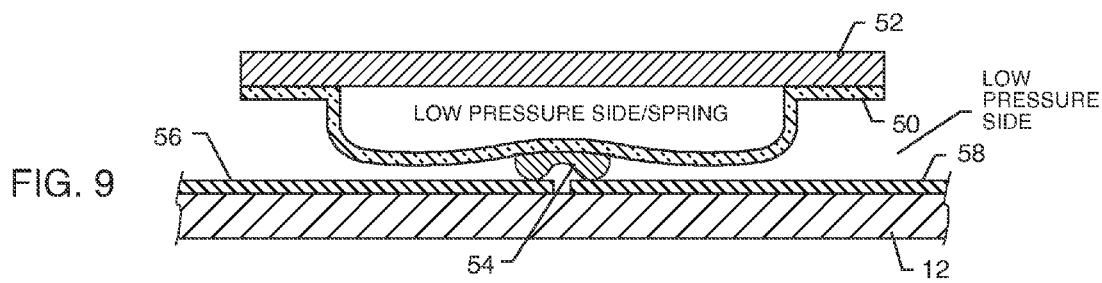
FIG. 9 is a sectional view taken of the structure of FIG. 7 along lines 9-9 wherein the high pressure is released.
Figure 10:
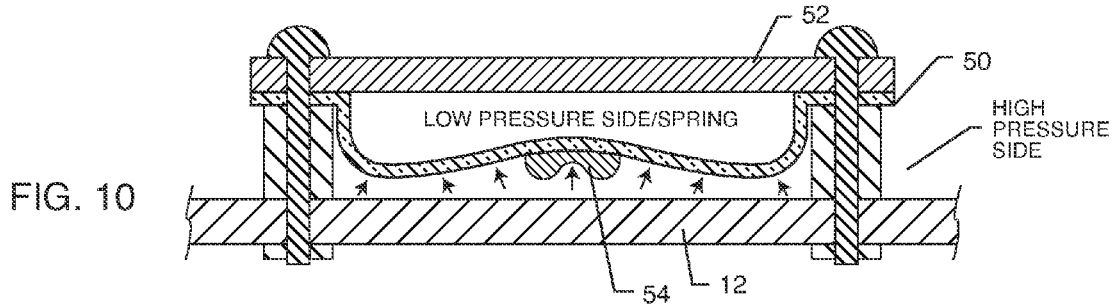
FIG. 10 is a sectional view taken of the structure of FIG. 7 along lines 10-10 wherein the high pressure is present.

It is preferred that the pressure sensor assembly 10 be fully enclosed in the pressurized enclosure of the package 46. FIGS. 7-10 show just one simple embodiment that creates a pressure sensor assembly 10. FIG. 7 is a top view of a simplistic pressure sensor assembly 10. FIGS. 8-10 are sectional views through the structure of FIG. 7. In FIGS. 8 and 10, the pressure sensor assembly 10 is disposed within a high pressure side of a package 46. High air pressure is acted upon a flexible membrane 50 that is sealed against a top substrate 52. A conductive switch 54 is placed onto the flexible membrane 50. When the pressure sensor assembly 10 is inside the high pressure side, a force is exerted against the flexible membrane 50. This then moves the conductive switch 54 away from a first conductive path 56 and a second conductive path 58. The low pressure side 60 of the membrane 50 may also be a spring/bias element (not shown) located therein. The spring/bias element is configured with the appropriate force to be actuated by a release of the pressure.

When the package 46 is opened, the membrane 50 moves downward as shown herein in FIG. 9. The conductive switch 54 then contacts the first and second conductive paths 56 and 58 which then completes an electrical circuit to send the signal 44. The exemplary embodiments disclosed herein is merely representative of just one example of a pressure sensor assembly 10. It is understood that those skilled in the art after understanding this disclosure could use other structures and geometries to accomplish similar goals and objectives. Therefore, the invention is not limited to the precise forms disclosed herein. The provisional application 61/786, 597 also showed a similar embodiment of a pilf resistant packaging system embodying the present invention. The contents of the provisional application are incorporated herein with this reference.

Figure 11:
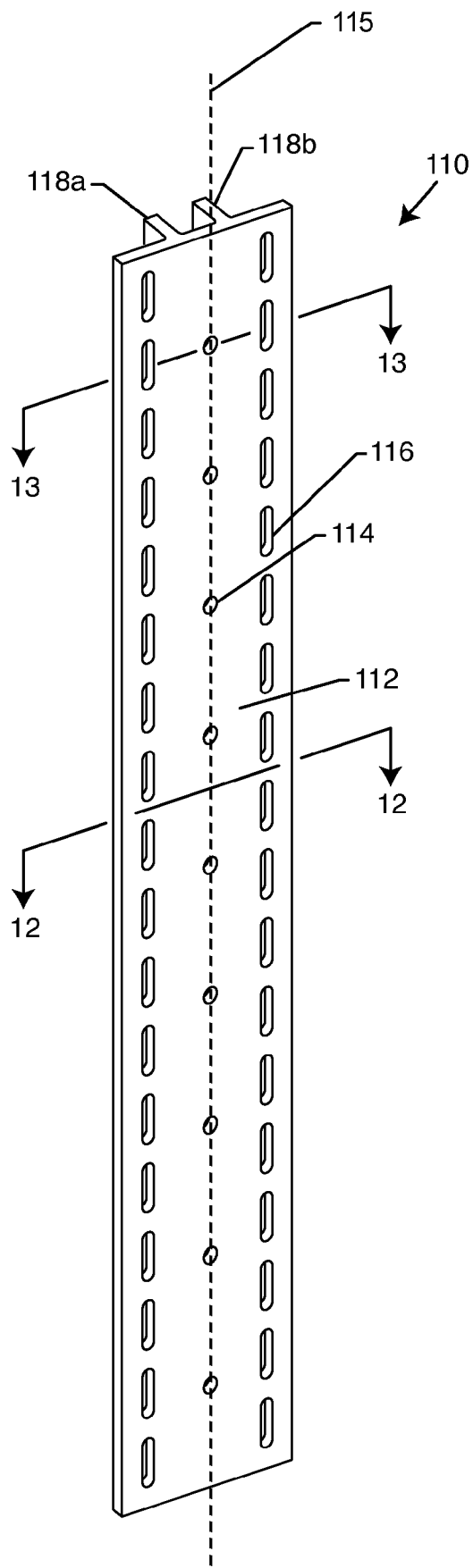
FIG. 11 is a perspective view of an exemplary plate embodying the present invention.
Figure 12:
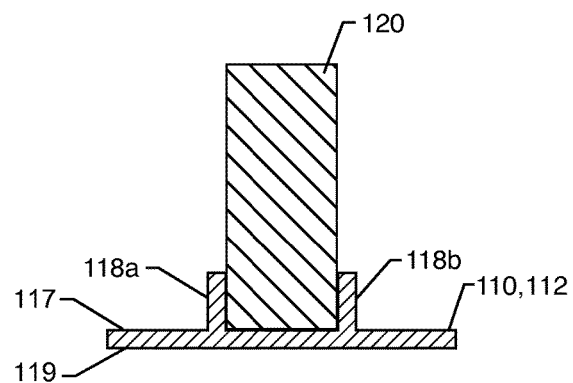
FIG. 12 is a sectional view taken of the structure of FIG. 11 along lines 12-12.
Figure 13:
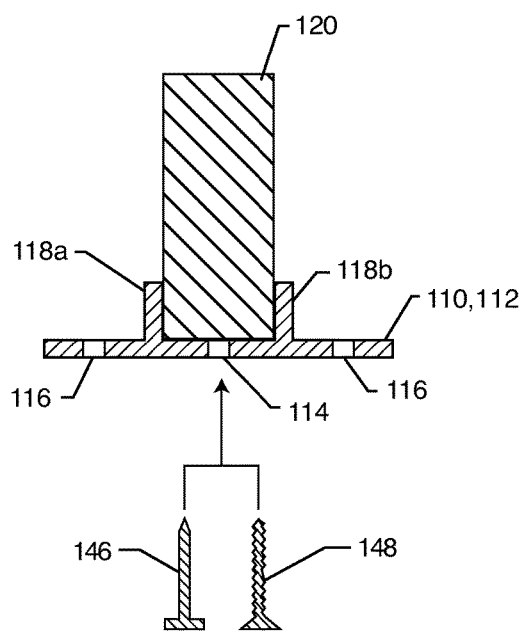
FIG. 13 is a sectional view taken of the structure of FIG. 11 along lines 13-13.
Figure 14:
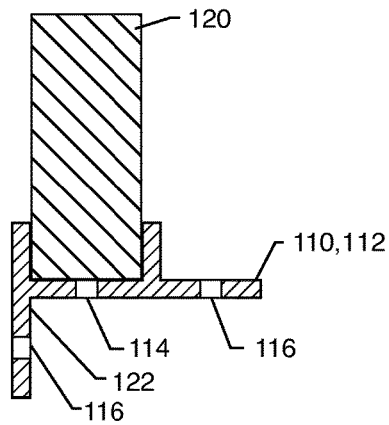
FIG. 14 is a sectional view similar to FIG. 13 now where the plate has an angled bend.
Figure 15:
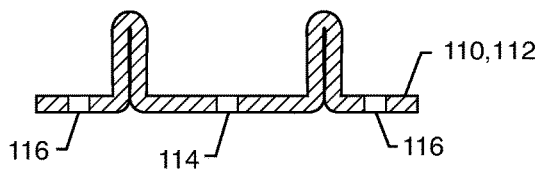
FIG. 15 is a sectional view similar to FIG. 13 now where the plate is manufactured in a bending step.

The second invention disclosed herein discloses a modular wall panel system 100. FIG. 11 is a perspective view of an exemplary track 110. The track 110 is a relatively long and thin structure that is configured to be mounted directly to a stud 120. Therefore, the track 110 would typically be quite long such that it was able to be mounted to a significant vertical portion of the stud 120 from the bottom of the floor to the top of the ceiling. The track 110 may be made from a variety of materials and methods. It would be typical for the track 110 to be made from an extrusion of metal as shown in FIGS. 12, 13 and 14. However, the track 110 can be made from a flat piece of metal and then folded into shape as shown in FIG. 15. The track 110 may be made from any structural material including metal, plastic, polymers, composites or combinations thereof.

The track 110 comprises a flat base 112 (i.e. a flat rectangular plate) which includes a plurality of fixture holes (fixture apertures) 114 along a centerline 115 of the plate and a plurality of slots (panel apertures) 116. At least two fixture holes 114 should be used to properly attach the track 110 to the stud, but in another embodiment at least 3-10 or more fixture holes 114 can be used. The plurality of slots 116 must be many in number to allow the ease of placement of the panels 124 (discussed later herein), therefore in one embodiment the plurality of slots is at least 5-18 slots or more.

The track 110 also has first extension 118a and a second extension 118b. The extensions 118 are typically perpendicular to the base 112 and extend along a backside 117, such that no extensions extend beyond the frontside 119. The width between the extensions are the same as the width of a 2×4 used in building constructions. The extensions 118 are used as guides to help place and capture the stud 120. During attachment of the track 110 to the stud 120, the extensions 118 dramatically increase the ease of placement. Fasteners may then be used to permanently attach the track 110 to the stud 120 through the plurality of fixture holes 114. As shown in FIG. 13, either a nail 146 or a screw 148 can be used to go through the holes 114 and permanently attach the track 110 to the stud 120.

Figure 16:
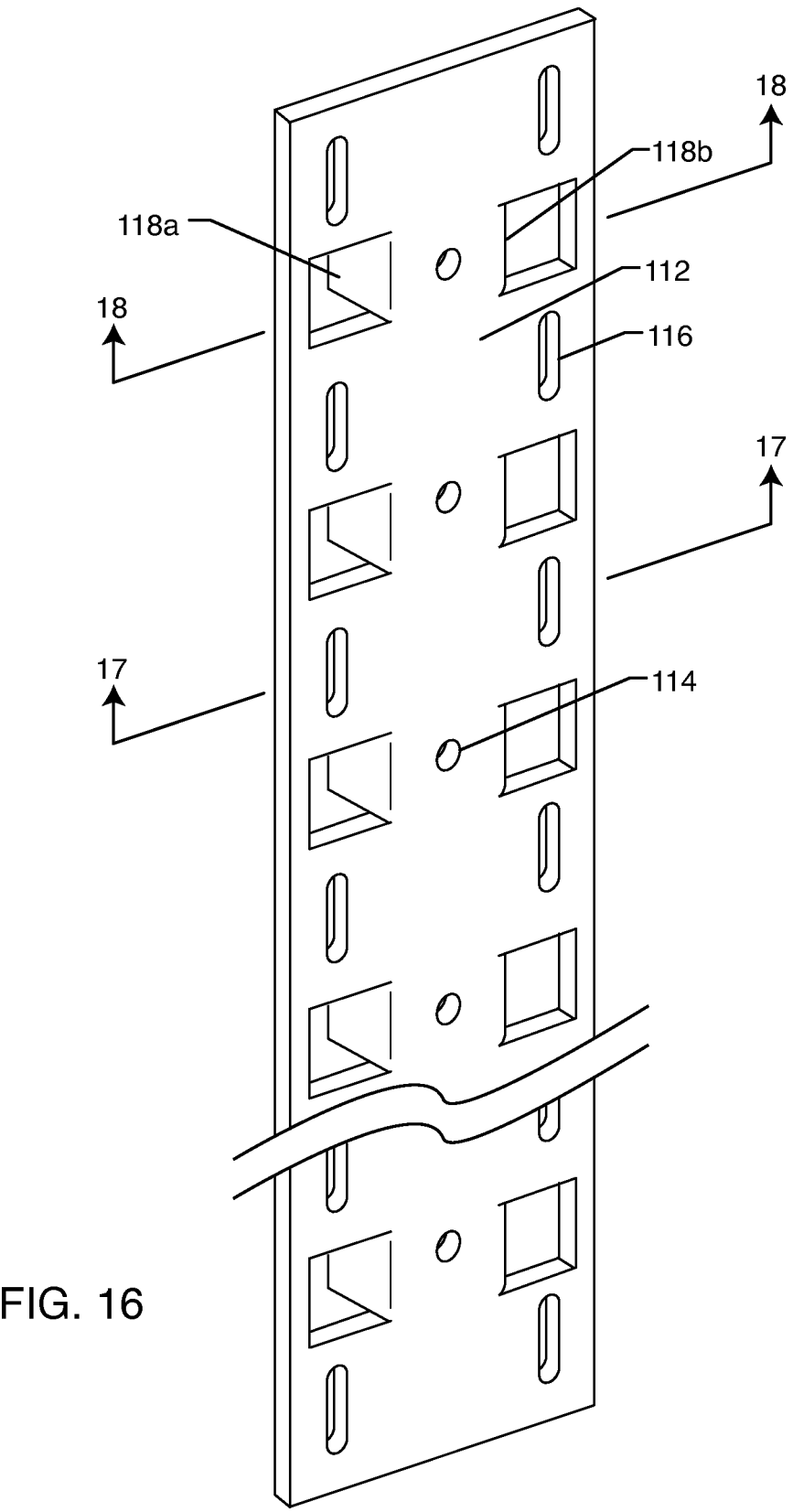
FIG. 16 is a perspective view of another exemplary plate embodying the present invention.

The extensions 118 can be on just one side (left to right) of the flat base 112 (not shown) or be on both sides of the base 112 as shown in FIG. 16. Alternatively, the extensions 118 can alternate sides (left to right) of the base 112 such that at least three extensions 118 are used with at least two extensions on one side and one extension 118 on the other side, therefore providing a minimum amount of extensions required to properly lock the track 110 onto and/or be positioned onto the stud 120.

Figure 17:
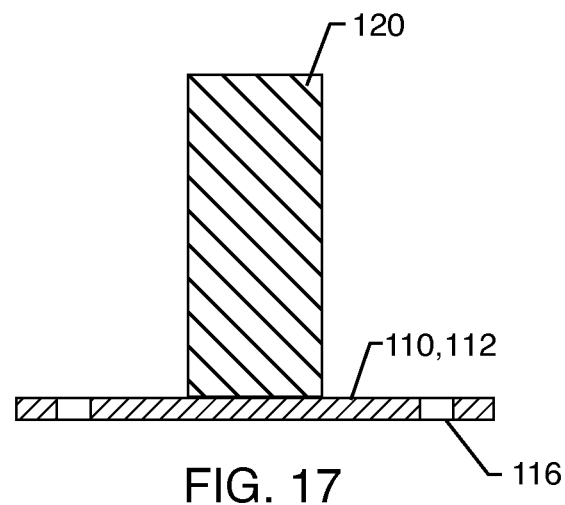
FIG. 17 is a sectional view taken of the structure of FIG. 16 along lines 17-17.
Figure 18:
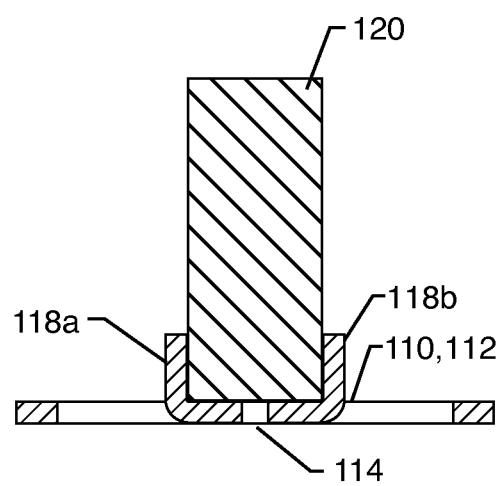
FIG. 18 is a sectional view taken of the structure of FIG. 16 along lines 18-18.

FIGS. 16-18 show an embodiment where the track 110 is comprised of a flat base 112. Then the holes 114 and slots 116 are punched through the base 112 in one operation. At the same time the extensions 118 can be formed as tabs 118a and 118b that are bent over. In this manner the tabs 118, holes 114 and slots 116 can be made in one stamping operation.

FIG. 14 is an embodiment of the track 110 that has an angle 122 to the base 112. This embodiment would be best used in a corner of a building's wall.

Figure 19:
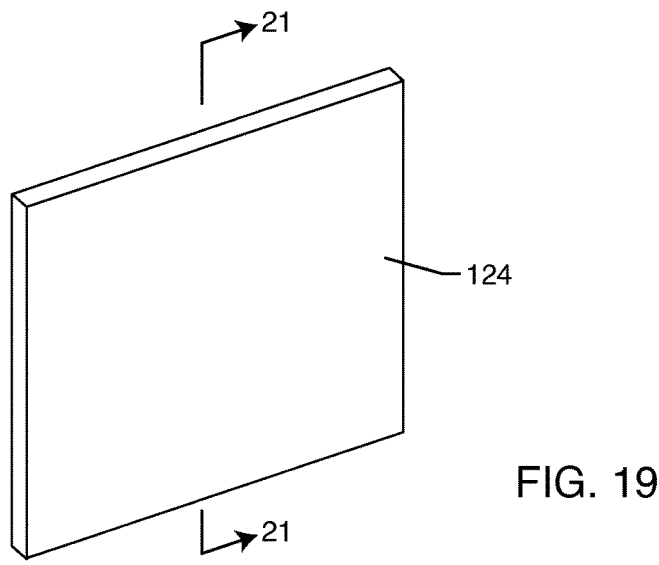
FIG. 19 is a perspective view of a front side of an exemplary panel of embodying the present invention.
Figure 20:
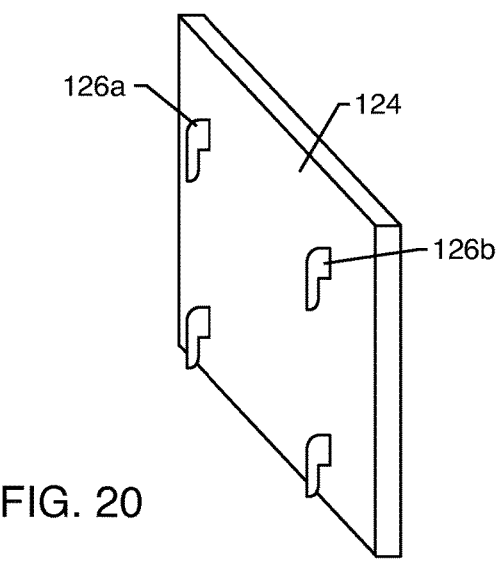
FIG. 20 is a perspective view of the back side of the structure of FIG. 19.
Figure 21:
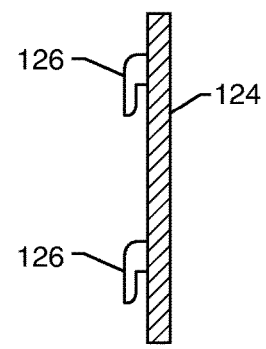
FIG. 21 is a sectional view of the structure of FIG. 19 taken along lines 21-21.

FIGS. 19-21 show one embodiment of an exemplary embodiment of a panel 124 of the present invention. The panel 124 may be made of a single substrate 124 or a plurality of substrates. Various materials can comprise the panel 124 such as wood, plastics, polymers, metal, composites or combinations thereof. On a backside of the panel 124 are a plurality of hooks 126. Each panel 124 has at least a left side hook 126a and a right side hook 126b. The hooks 126 are configured to slip within the slots 116 and engage the slots 116 such that the panel is fixed and captured to the track 110. The dimension between the left-side hook 126a and the right-side hook 126b is spaced to be equal to the slots 126 on two adjacent tracks 110 when installed upon the studs 120. If studs 120 are placed 16 inches apart, it is foreseeable that the distance between the hooks 126 would be about 12-15 inches, or around 14 inches.

It is important that the studs 120 be accurately placed during manufacturing. Therefore, a surrogate panel (not shown) can be made that is simply two hooks separated at a set distance. The surrogate panel is used to locate the studs before they are affixed to the permanent structure. The surrogate panel can then be removed or left in place for structural strength and continued alignment. The surrogate panel may be one thin piece of material that is designed to fit behind the regular panels 124.

The present invention teaches one embodiment of slots 116 and hooks 126 used for removably attaching the panels 124 to the tracks 110. However a variety of structures could be used that accomplish similar functionality. Therefore, this disclosure is not limited to the precise forms described and shown herein.

Figure 22:
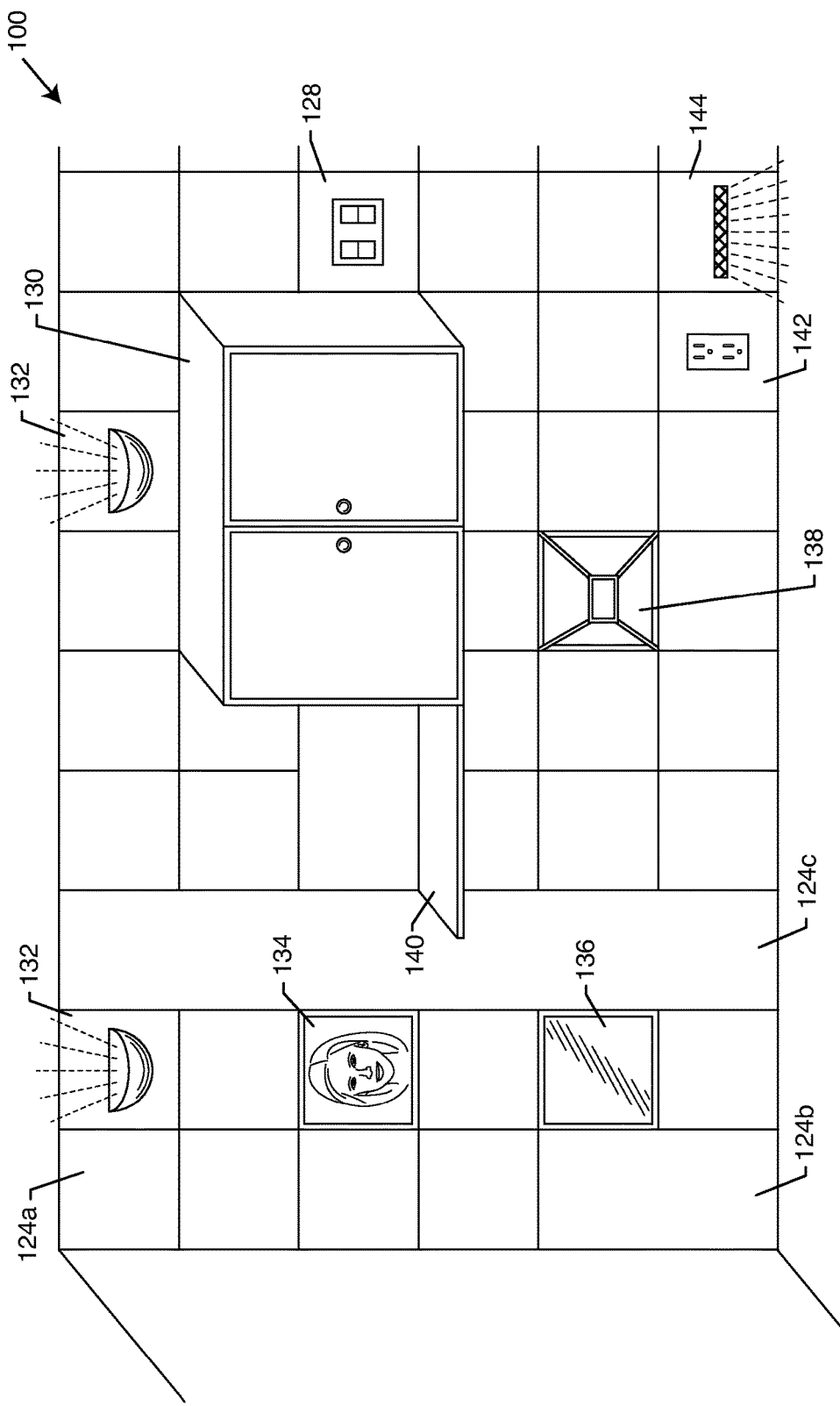
FIG. 22 is a perspective view of an exemplary embodiment of the modular wall paneling system of the present invention.

FIG. 22 shows a perspective view of the modular wall panel system 100. The panels 124 can come in a variety of sizes and shapes. Panel 124a is square in shape. Panel 124b is rectangular in shape. Panel 124c is very long and rectangular in shape and extends from the floor to the ceiling.

The panels 124 can also be configured with a variety of structures and features such as light switch panel 128, cabinet panel 130, light bulbs panel 132 (backlight panel also possible), picture frame panel 134, mirror panel 136, T.V. stand panel 138 (any electronic equipment stand also possible), shelf panel 140, electrical socket panel 142, air register panel 144, and any other unique and custom panel 124. Panels 124 can also include rods (not shown) for hanging clothing, such as is used in a closet. As one can see the use of specially configured panels 124 is endless.

As can be seen by one skilled in the art, the panels and various panel features are easily moved and replaced. This provides the user with an ability to easily change and customize a wall for their particular needs. The present invention is ideally suited to be used along walls such as inside closets and along entertainment walls that would utilize and store a variety of electrical equipment or inside garages where storage, configurability and modularity is desired.

The panels themselves can come in a variety of shapes, but also in a variety of materials, textures and design. For instance, panels can come in different colors where a user doesn't need to repaint a wall but needs to simply exchange one set of panels for another. The panels can be metalized, cloth covered or wall paper covered to create various designs. The panels may be covered in only a thin fabric and sound insulation placed between the studs to help absorb sound for use in a sound room.

Various panel exchanges can be set up where a customer can exchange one panel for another. For instance, a customer can remove a set of panels and get credit for returning unneeded panels. This credit can then be used to help pay for new panels of varying designs. An aftermarket economy is possible that deals with trading used panels between customers.

The present invention replaces the need for drywall. Therefore some cost saving is associated with the reduction of materials and labor for installing and surfacing the drywall. Also, it is easy for a user to reconfigure a specific wall layout without the need for tools or specialized expertise in home construction. Any person can simply take a panel off and replace it with a new panel, as it literally only takes seconds to accomplish.

The panels are also earthquake proof, as the hook 126 is securely held within the slots 116.

The provisional application 61/786,597 also showed a similar embodiment of a modular wall panel system bodying the present invention. The contents of the provisional application are incorporated herein with this reference Although several embodiments have been described in detail for purposes of illustration, various modifications may be made to each without departing from the scope and spirit of the invention. Accordingly, the invention is not to be limited, except as by the appended claims.

What is claimed is:

1. A modular wall paneling system, comprising:
   at least two plates, each plate defining a longitudinal length and a frontside opposite a backside, and each plate comprising a plurality of fixture apertures disposed through each respective plate disposed along the longitudinal length of each respective plate, and each plate comprising a plurality of panel apertures disposed through each respective plate disposed along the longitudinal length of each respective plate, where the plurality of fixture apertures for each respective plate are disposed generally parallel along the longitudinal length to the plurality of panel apertures for each respective plate;
   wherein each plate comprises an extension extending from and disposed perpendicular to the backside of each plate, the extension extending at least a portion along the longitudinal length, and wherein no extension extends perpendicularly beyond the frontside;
   wherein for each plate the plurality of fixture apertures are disposed parallel on one side of the extension and the plurality of panel apertures are disposed parallel on the other side of the extension;

wherein each plate comprises a void starting from the backside of each plate aligned along and in spatial communication with the plurality of fixture apertures, the void extending perpendicularly away from the backside adjacent to the extension, wherein the void is open-ended extending perpendicularly away from the backside and accessible in the direction perpendicular to the backside of each plate to receive a stud in a building frame of a building wherein the backside and the extension are configured to abut the stud and wherein a fastener is configured to extend through a respective fixture aperture and into a respective stud to attach the respective stud within the void of a respective plate; and a plurality of panels, each panel having a panel substrate and each panel having at least two hooks disposed on a backside of the panel substrate, where each of the at least two hooks are configured to removably lock into the plurality of panel apertures of the at least two plates.

2. The system of claim 1, wherein at least one panel from the plurality of panels comprises an electronic switch panel, a light switch panel, a cabinet panel, a light bulb panel, a back lit panel, a picture frame panel, a mirror panel, a T.V. stand panel, an electronic equipment stand panel, an equipment stand panel, a shelf panel, an electrical socket panel or an air register panel.

3. The system of claim 1, wherein each respective plate comprises a second set of a plurality of panel apertures.

4. The system of claim 3, wherein the second set of the plurality of panel apertures on each respective plate are disposed parallel to the plurality of fixture apertures on an opposite side of the first set of the plurality of panel apertures.

5. The system of claim 1, wherein at least one plate from the at least two plates comprises an angled bend.

6. The system of claim 1, wherein the at least two plates are extruded.

7. The system of claim 1, wherein the at least two plates are formed from a single flat piece of metal and then the plurality of fixture apertures on each respective plate and the plurality of panel apertures on each respective plate are punched.

8. The system of claim 7, wherein the extension on each respective plate comprise a plurality of tabs.

9. The system of claim 8, wherein the plurality of tabs on each respective plate are cut and bent at the same time the plurality of fixture apertures and panel apertures on each respective plate are formed.

10. The system of claim 9, wherein the plurality of tabs on each respective plate comprise at least two tabs, wherein the at least two tabs on each respective plate are disposed on one side about the plurality of fixture apertures on each respective plate and at least one additional tab on each respective plate is disposed on the other side about the plurality of fixture apertures on each respective plate.

11. The system of claim 1, wherein the plurality of panel apertures on each respective plate comprise at least five slots.

12. The system of claim 1, wherein the plurality of fixture apertures on each respective plate comprise at least two holes.

13. The system of claim 1, wherein the at least two plates are at least two flat rectangular plates.

14. The system of claim 1, wherein no portion of each plate resides within the void thereby preventing a stud from being abutted against the backside of each plate.

15. A modular wall paneling system, comprising:

a first flat rectangular plate extending along a first longitudinal length and defining a first frontside opposite a first backside, the first plate comprising a plurality of first fixture holes extending along the first longitudinal length disposed generally along a first centerline of the first plate, the first plate comprising a first plurality of panel slots extending along the first longitudinal length disposed adjacent to the first plurality of fixture holes, the first plate comprising a first extension disposed along the first longitudinal length and extending perpendicular to the first backside of the first plate, wherein the plurality of first fixture holes are disposed to one side of the first extension and the first plurality of panel slots are disposed on the other side of the first extension, wherein the first plate comprises a first void starting from the first backside of the first plate aligned along and in spatial communication with the plurality of first fixture holes, the first void extending perpendicularly away from the first backside adjacent to the first extension, wherein the first void is open-ended extending perpendicularly away from the backside and accessible in the direction perpendicular to the backside of the first plate to receive a first stud in a building frame of a building, wherein the first backside and the first extension are configured to abut the first stud, and wherein no extension extends perpendicularly beyond the first frontside;

a second flat rectangular plate extending along a second longitudinal length and defining a second frontside opposite a second backside, the second plate comprising a plurality of second fixture holes extending along the second longitudinal length disposed generally along a second centerline of the second plate, the second plate comprising a second plurality of panel slots extending along the second longitudinal length disposed adjacent to the second plurality of fixture holes, the second plate comprising a second extension disposed along the second longitudinal length and extending perpendicular to the second backside of the second plate, wherein the plurality of second fixture holes are disposed to one side of the second extension and the second plurality of panel slots are disposed on the other side of the second extension, wherein the second plate comprises a second void starting from the second backside of the second plate aligned along and in spatial communication with the plurality of second fixture holes, the second void extending perpendicularly away from the second backside adjacent to the second extension, wherein the second void is open-ended extending perpendicularly away from the backside and accessible in the direction perpendicular to the backside of the second plate to receive a second stud in the building frame of the building, wherein the second backside and the second extension are configured to abut the second stud, and wherein no extension extends perpendicularly beyond the second frontside;

wherein the first and second plates are configured to be installed on adjacent first and second studs in the building frame of the building through fasteners that extend through respective fixture holes and into a respective stud; and a plurality of panels, each panel having a panel substrate with a panel frontside and a panel backside, each panel backside comprising at least two hooks where one hook is disposed on a right side of each panel substrate and a second hook is disposed on a left side of each panel substrate, wherein the at least two hooks are configured to removably attach with the first and second plurality of panel slots when the first plate and second plate are attached to the adjacent studs on the building frame.

16. The system of claim 15, wherein the first plate and first extension and also the second plate and second extension are made in an extrusion process.

17. The system of claim 15, wherein the first and second plates are formed from a single flat piece of metal and then first and second extension of each plate are formed in a punching and bending process.

18. The system of claim 17, wherein the first extension comprises a first plurality of tabs and the second extension comprises a second plurality of tabs.

19. The system of claim 18, wherein for each plate the first and second plurality of tabs each comprise at least two tabs, wherein the at least two tabs are disposed on one side about each respective plurality of fixture holes and at least one additional tab is disposed on the other side about each respective plurality of fixture holes.

20. The system of claim 15, wherein at least one panel from the plurality of panels comprises an electronic switch panel, a light switch panel, a cabinet panel, a light bulb panel, a back lit panel, a picture frame panel, a mirror panel, a T.V. stand panel, an electronic equipment stand panel, an equipment stand panel, a shelf panel, an electrical socket panel or an air register panel.

\* \* \* \* \*